(12) United States Patent
Kar et al.

(10) Patent No.: US 12,067,601 B2
(45) Date of Patent: Aug. 20, 2024

(54) SYSTEMS AND METHODS FOR GENERATING A DIGITAL IDENTITY OF EQUIPMENT ON AN EQUIPMENT ONLINE MARKETPLACE PLATFORM

(71) Applicant: Honeywell International Inc., Morris Plains, NJ (US)

(72) Inventors: Satyanarayan Kar, Bangalore (IN); Lisa Estipona Butters, Chandler, AZ (US); Sujay Rao, Karnataka (IN); Keerthi Jayarajan, Tamilnadu (IN); Sravan Kommuri, Hyperbad (IN); Sathish Muthukrishnan, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 722 days.

(21) Appl. No.: 16/531,594

(22) Filed: Aug. 5, 2019

(65) Prior Publication Data
US 2020/0151784 A1  May 14, 2020

Related U.S. Application Data

(60) Provisional application No. 62/758,197, filed on Nov. 9, 2018.

(51) Int. Cl.
*G06Q 30/0601* (2023.01)
*G06F 16/23* (2019.01)
*G06F 16/25* (2019.01)

(52) U.S. Cl.
CPC ..... *G06Q 30/0603* (2013.01); *G06F 16/2379* (2019.01); *G06F 16/254* (2019.01)

(58) Field of Classification Search
CPC .................................................. G06Q 30/0603
See application file for complete search history.

(56) References Cited

U.S. PATENT DOCUMENTS

| 4,799,156 A | 1/1989 | Shavit et al. |
| 6,249,773 B1 | 6/2001 | Allard et al. |

(Continued)

FOREIGN PATENT DOCUMENTS

| WO | 03/38560 A2 | 5/2003 |
| WO | 2018/014123 A1 | 1/2018 |

OTHER PUBLICATIONS

Extended European Search Report mailed Mar. 16, 2020 in European Application No. 19207321.1 (7 pages).

(Continued)

*Primary Examiner* — Van H Oberly
(74) *Attorney, Agent, or Firm* — Alston & Bird LLP

(57) ABSTRACT

A computer-implemented method for generating a digital identity of equipment on an equipment online marketplace platform is disclosed. The method may include: receiving, by a server executing the equipment online marketplace platform through a network, one or more images or documents containing information of the equipment from a user accessing the equipment online marketplace platform on a user device through the network; extracting, by the server, from the images or documents of the equipment information identifying the equipment; and generating, by the server, a blockchain entry for the equipment in a shared ledger, the blockchain entry containing the information identifying the equipment.

20 Claims, 5 Drawing Sheets

(56) References Cited

U.S. PATENT DOCUMENTS

| | | |
|---|---|---|
| 6,266,649 B1 | 7/2001 | Linden et al. |
| 6,343,275 B1 | 1/2002 | Wong |
| 6,512,919 B2 | 1/2003 | Ogasawara |
| 6,535,880 B1 | 3/2003 | Musgrove et al. |
| 6,556,904 B1 | 4/2003 | Larson et al. |
| 6,564,192 B1 | 5/2003 | Kinney, Jr. et al. |
| 6,609,132 B1 | 8/2003 | White et al. |
| 6,611,814 B1 | 8/2003 | Lee et al. |
| 6,671,674 B1 | 12/2003 | Anderson et al. |
| 6,704,716 B1 | 3/2004 | Force |
| 6,732,161 B1 | 5/2004 | Hess et al. |
| 6,847,938 B1 | 1/2005 | Moore |
| 6,850,899 B1 | 2/2005 | Chow et al. |
| 6,850,917 B1 | 2/2005 | Hom et al. |
| 6,879,985 B2 | 4/2005 | Deguchi et al. |
| 6,901,377 B1 | 5/2005 | Rosenfeld et al. |
| 6,901,430 B1 | 5/2005 | Smith |
| 6,904,410 B1 | 6/2005 | Weiss et al. |
| 6,915,271 B1 | 7/2005 | Meyer et al. |
| 6,917,922 B1 | 7/2005 | Bezos et al. |
| 6,925,444 B1 | 8/2005 | McCollom et al. |
| 6,965,882 B1 | 11/2005 | Lapstun et al. |
| 6,980,963 B1 | 12/2005 | Hanzek |
| 7,024,376 B1 | 4/2006 | Yuen |
| 7,054,824 B1 | 5/2006 | Grenchus, Jr. et al. |
| 7,058,602 B1 | 6/2006 | La Mura et al. |
| 7,062,460 B1 | 6/2006 | Growney et al. |
| 7,082,426 B2 | 7/2006 | Musgrove et al. |
| 7,103,567 B2 | 9/2006 | Smukowski |
| 7,107,226 B1 | 9/2006 | Cassidy et al. |
| 7,107,227 B1 | 9/2006 | Bezos et al. |
| 7,120,672 B1 | 10/2006 | Szeto et al. |
| 7,263,498 B1 | 8/2007 | Van Horn et al. |
| 7,296,033 B1 | 11/2007 | Lynch |
| 7,315,832 B2 | 1/2008 | Bauer et al. |
| 7,315,833 B2 | 1/2008 | Schrenk |
| 7,330,082 B2 | 2/2008 | Hung et al. |
| 7,330,826 B1 | 2/2008 | Porat et al. |
| 7,373,317 B1 | 5/2008 | Kopelman et al. |
| 7,376,599 B1 | 5/2008 | Gerhardt |
| 7,376,613 B1 | 5/2008 | Cofino et al. |
| 7,383,206 B2 | 6/2008 | Rupp et al. |
| 7,389,294 B2 | 6/2008 | Kotas et al. |
| 7,424,457 B2 | 9/2008 | Khaishgi et al. |
| 7,472,076 B2 | 12/2008 | Garg et al. |
| 7,472,077 B2 | 12/2008 | Roseman et al. |
| 7,478,054 B1 | 1/2009 | Adams et al. |
| 7,493,274 B2 | 2/2009 | Bezos et al. |
| 7,497,369 B2 | 3/2009 | Dalzell et al. |
| 7,533,364 B2 | 5/2009 | Ramaswamy et al. |
| 7,533,369 B2 | 5/2009 | Sundararajan et al. |
| 7,594,189 B1 | 9/2009 | Walker et al. |
| 7,603,653 B2 | 10/2009 | Sundararajan et al. |
| 7,610,219 B2 | 10/2009 | Sayed |
| 7,614,552 B2 | 11/2009 | Roseman et al. |
| 7,617,128 B2 | 11/2009 | Greak |
| 7,640,251 B2 | 12/2009 | Sundararajan et al. |
| 7,647,243 B2 | 1/2010 | Woolston |
| 7,657,542 B2 | 2/2010 | Sundararajan et al. |
| 7,660,740 B2 | 2/2010 | Boone et al. |
| 7,665,085 B2 | 2/2010 | Sundararajan et al. |
| 7,668,821 B1 | 2/2010 | Donsbach et al. |
| 7,698,169 B2 | 4/2010 | Raccah et al. |
| 7,702,540 B1 | 4/2010 | Woolston |
| 7,720,833 B1 | 5/2010 | Wen et al. |
| 7,739,148 B2 | 6/2010 | Suzuki et al. |
| 7,774,238 B2 | 8/2010 | Gopalpur et al. |
| 7,774,305 B2 | 8/2010 | Devalla et al. |
| 7,793,258 B2 | 9/2010 | Sundararajan et al. |
| 7,813,967 B2 | 10/2010 | Kopelman et al. |
| 7,835,945 B2 | 11/2010 | Scruton et al. |
| 7,840,558 B2 | 11/2010 | Wiseman et al. |
| 7,877,353 B2 | 1/2011 | Ahmed et al. |
| 7,881,985 B2 | 2/2011 | Yang et al. |
| 7,908,180 B2 | 3/2011 | Goclowski |
| 7,921,052 B2 | 4/2011 | Dabney et al. |
| 7,945,480 B2 | 5/2011 | Scruton et al. |
| 7,966,243 B2 | 6/2011 | Taylor et al. |
| 7,979,340 B2 | 7/2011 | MacDonald Korth et al. |
| 7,980,466 B2 | 7/2011 | Lee et al. |
| 7,983,809 B2 | 7/2011 | Kell et al. |
| 7,983,963 B2 | 7/2011 | Byrne et al. |
| 8,019,650 B2 | 9/2011 | Donsbach et al. |
| 8,041,611 B2 | 10/2011 | Kleinrock et al. |
| 8,108,260 B2 | 1/2012 | Maguire et al. |
| 8,170,915 B2 | 5/2012 | Borders et al. |
| 8,185,552 B1 | 5/2012 | Chow et al. |
| 8,209,300 B2 | 6/2012 | Malkowicz et al. |
| 8,209,660 B2 | 6/2012 | Sundararajan et al. |
| 8,244,666 B2 | 8/2012 | Loftus et al. |
| 8,245,150 B2 | 8/2012 | Katter, Jr. et al. |
| 8,255,291 B1 | 8/2012 | Nair |
| 8,266,014 B1 | 9/2012 | Bhosle et al. |
| 8,307,339 B2 | 11/2012 | Sundararajan et al. |
| 8,311,896 B2 | 11/2012 | Mesaros |
| 8,311,900 B1 | 11/2012 | Bates et al. |
| 8,321,293 B2 | 11/2012 | Lewis et al. |
| 8,326,662 B1 | 12/2012 | Byrne et al. |
| 8,335,822 B2 | 12/2012 | Ahmed et al. |
| 8,352,328 B2 | 1/2013 | Woolston |
| 8,370,269 B2 | 2/2013 | MacDonald Korth et al. |
| 8,374,920 B2 | 2/2013 | Hedges et al. |
| 8,392,297 B2 | 3/2013 | Bowser et al. |
| 8,412,594 B2 | 4/2013 | Kundu |
| 8,463,658 B2 | 6/2013 | Racco |
| 8,510,298 B2 | 8/2013 | Khandelwi |
| 8,521,609 B2 | 8/2013 | Lewis et al. |
| 8,572,563 B2 | 10/2013 | Sundararajan et al. |
| 8,577,747 B1 | 11/2013 | Krechel et al. |
| 8,583,480 B2 | 11/2013 | Byrne |
| 8,676,654 B2 | 3/2014 | Lawton |
| 8,687,104 B2 | 4/2014 | Penov et al. |
| 8,719,075 B2 | 5/2014 | MacDonald Korth et al. |
| 8,725,581 B2 | 5/2014 | Breed et al. |
| 8,737,729 B2 | 5/2014 | Bhardwaj et al. |
| 8,745,478 B2 | 6/2014 | Braun et al. |
| 8,819,619 B2 | 8/2014 | Sundararajan et al. |
| 8,935,286 B1 | 1/2015 | Westerman, Jr. et al. |
| 9,009,658 B2 | 4/2015 | Sundararajan et al. |
| 9,043,232 B1 | 5/2015 | Varadarajan |
| 9,092,523 B2 | 7/2015 | Tanne et al. |
| 9,213,839 B2 | 12/2015 | Cao et al. |
| 9,230,238 B2 | 1/2016 | Zappa et al. |
| 9,405,773 B2 | 8/2016 | Chittar et al. |
| 9,418,050 B1 | 8/2016 | Brewster |
| 9,436,754 B1 | 9/2016 | Hu et al. |
| 9,483,788 B2 | 11/2016 | Martin |
| 9,495,697 B2 | 11/2016 | Williams et al. |
| 9,692,738 B1 | 6/2017 | Wenneman et al. |
| 9,704,194 B2 | 7/2017 | Grove et al. |
| 9,715,542 B2 | 7/2017 | Lu et al. |
| 9,747,622 B1 | 8/2017 | Johnson et al. |
| 9,767,505 B1 | 9/2017 | Shi |
| 9,779,451 B2 | 10/2017 | Fisher |
| 9,805,425 B2 | 10/2017 | MacDonald Korth et al. |
| 9,830,632 B2 | 11/2017 | Lenahan et al. |
| 9,904,949 B1 | 2/2018 | Tavernier |
| 9,934,544 B1 | 4/2018 | Whitfield et al. |
| 9,953,365 B2 | 4/2018 | Friedman |
| 10,810,656 B1 | 10/2020 | McCroskey et al. |
| 10,841,100 B2 | 11/2020 | Lam et al. |
| 10,872,304 B1* | 12/2020 | Eisenmann .............. B64D 1/12 |
| 2001/0018672 A1 | 8/2001 | Petters et al. |
| 2002/0006576 A1 | 1/2002 | Sato et al. |
| 2002/0120537 A1 | 8/2002 | Morea et al. |
| 2003/0204447 A1 | 10/2003 | Dalzell et al. |
| 2003/0204449 A1 | 10/2003 | Kotas et al. |
| 2005/0203764 A1 | 9/2005 | Sundararajan et al. |
| 2005/0203865 A1 | 9/2005 | Sundararajan et al. |
| 2005/0203871 A1 | 9/2005 | Devalla et al. |
| 2005/0203913 A1 | 9/2005 | Sundararajan et al. |
| 2005/0203942 A1 | 9/2005 | Sundararajan et al. |
| 2005/0203955 A1 | 9/2005 | Ramaswamy et al. |
| 2005/0204201 A1 | 9/2005 | Meenakshisundaram et al. |

(56) References Cited

U.S. PATENT DOCUMENTS

| | | |
|---|---|---|
| 2005/0204332 A1 | 9/2005 | Krishnan et al. |
| 2005/0204334 A1 | 9/2005 | Parthasarathy et al. |
| 2005/0204354 A1 | 9/2005 | Sundararajan et al. |
| 2005/0204356 A1 | 9/2005 | Sundararajan et al. |
| 2005/0210442 A1 | 9/2005 | Seetharaman et al. |
| 2005/0216881 A1 | 9/2005 | Sankaran et al. |
| 2005/0216882 A1 | 9/2005 | Sundararajan et al. |
| 2005/0216890 A1 | 9/2005 | Sundararajan et al. |
| 2005/0216891 A1 | 9/2005 | Sundararajan et al. |
| 2007/0118441 A1 | 5/2007 | Chatwani et al. |
| 2009/0024980 A1 | 1/2009 | Sundararajan et al. |
| 2009/0246547 A1 | 1/2009 | Sundararajan et al. |
| 2009/0300585 A1 | 12/2009 | Meenakshisundaram et al. |
| 2010/0058287 A1 | 3/2010 | Sundararajan et al. |
| 2010/0241528 A1 | 9/2010 | Hedges et al. |
| 2010/0306067 A1 | 12/2010 | Hui et al. |
| 2010/0325606 A1 | 12/2010 | Sundararajan et al. |
| 2012/0131543 A1 | 5/2012 | Sundararajan et al. |
| 2014/0137217 A1 | 5/2014 | Kowalchyk et al. |
| 2014/0372252 A1 | 12/2014 | Raney |
| 2016/0012465 A1* | 1/2016 | Sharp .................. G06Q 20/321 705/14.17 |
| 2018/0018723 A1* | 1/2018 | Nagla .................... G06Q 30/08 |
| 2018/0189855 A1* | 7/2018 | Hochman .......... G06Q 30/0633 |
| 2018/0293547 A1 | 10/2018 | Randhawa |
| 2018/0349968 A1 | 12/2018 | O'Brien et al. |
| 2018/0352033 A1 | 12/2018 | Pacella et al. |
| 2019/0349371 A1 | 11/2019 | Smith et al. |
| 2020/0034905 A1* | 1/2020 | Velusamy ............... H04L 67/02 |
| 2020/0151664 A1 | 5/2020 | Butters et al. |
| 2020/0151786 A1 | 5/2020 | Butters et al. |
| 2020/0184547 A1 | 6/2020 | Andon et al. |
| 2020/0186338 A1 | 6/2020 | Andon et al. |
| 2021/0209676 A1 | 7/2021 | Deol |

OTHER PUBLICATIONS

Extended European Search Report dated Mar. 17, 2020 in European Application No. 19207322.9 (8 pages).

L.A. Cutillo, R. Malva and M. bnen, "PRICE: Privacy preserving incentives for cooperation enforcement," 2012 IEEE International Symposium on a World of Wireless, Mobile and Multimedia Networks (WoWMoM), 2012, pp. 1-9. (Year: 2012).

* cited by examiner

SYSTEMS AND METHODS FOR GENERATING A DIGITAL IDENTITY OF EQUIPMENT ON AN EQUIPMENT ONLINE MARKETPLACE PLATFORM

CROSS-REFERENCE TO RELATED APPLICATION(S)

This application claims the benefit of priority to U.S. Provisional Patent Application No. 62/758,197, filed Nov. 9, 2018, the entirety of which is incorporated by reference herein.

TECHNICAL FIELD

Various embodiments of the present disclosure relate generally to an equipment online marketplace platforms for trading equipment and, more particularly, to systems and methods for generating a digital identity of equipment on an equipment online marketplace platform.

BACKGROUND

Traditionally, equipment, such as aerospace parts, may be bought and sold in primary and secondary safety-critical marketplaces. Such marketplaces typically include brochure inquiries, often relying on intermediaries which require buyers and sellers to have several conversations to assess the correctness of information/attributes tied to the equipment before a deal is made to sell the equipment. Today, approximately $4 billion of aerospace parts are traded annually throughout the world. However, less than 2% of the aerospace parts commerce is conducted through online marketplaces, such as e-commerce websites. In the aerospace industry, it is difficult to establish such an equipment online marketplace platform because there exists a lack of trust between the buyers and sellers on the online marketplace.

Buyers may lack trust in sellers in an equipment online marketplace for various reasons. First, buyers of equipment may lack trust in a seller's identity over the equipment online marketplace. Second, buyers may lack trust in a seller's posted listing. For example, ghost listings may be a problem in which sellers post equipment information while not physically having the equipment/inventory in possession. Third, buyers may also lack trust on the information/attributes of the posted listings, mapping to the physical equipment.

Likewise, sellers may lack trust in buyers in an equipment online marketplace for various reasons. First, sellers of equipment may lack trust in a buyer's identity over the equipment online marketplace. Second, sellers may lack trust in the mode of payment for the equipment from the buyer.

Furthermore, equipment trading, such as aerospace parts trading, may be spread between several high assets, such as airlines, airports, aircrafts, and/or original equipment manufacturers (OEMs). For example, highly demanding time-constrained services, such as airport gates and runways, may be traded. However, there is currently no integrated equipment online marketplace that integrates these resources amongst the various participants (e.g., airlines, airports, aircrafts, and OEMs).

The present disclosure is directed to overcoming one or more of these above-referenced challenges.

SUMMARY OF THE DISCLOSURE

In one aspect, a computer-implemented method for generating a digital identity of equipment on an equipment online marketplace platform is disclosed. The method may include: receiving, by a server executing the equipment online marketplace platform through a network, one or more images or documents containing information of the equipment from a user accessing the equipment online marketplace platform on a user device through the network; extracting, by the server, from the images or documents of the equipment information identifying the equipment; and generating, by the server, a blockchain entry for the equipment in a shared ledger, the blockchain entry containing the information identifying the equipment.

In another aspect, a system for generating a digital identity of equipment on an equipment online marketplace platform is disclosed. The system may include: a memory having processor-readable instruction therein; and at least one processor configured to access the memory and execute the processor-readable instructions, which when executed by the processor configures the processor to perform a plurality of functions, including functions for: receiving, by a server executing the equipment online marketplace platform through a network, one or more images or documents containing information of the equipment from a user accessing the equipment online marketplace platform on a user device through the network; extracting, by the server, from the images or documents of the equipment information identifying the equipment; and generating, by the server, a blockchain entry for the equipment in a shared ledger, the blockchain entry containing the information identifying the equipment.

In yet another aspect, a non-transitory computer-readable medium containing instructions for facilitating equipment trading through an equipment online marketplace platform is disclosed. The instructions may include instructions for: receiving, by a server executing the equipment online marketplace platform through a network, one or more images or documents containing information of the equipment from a user accessing the equipment online marketplace platform on a user device through the network; extracting, by the server, from the images or documents of the equipment information identifying the equipment; and generating, by the server, a blockchain entry for the equipment in a shared ledger, the blockchain entry containing the information identifying the equipment.

Additional objects and advantages of the disclosed embodiments will be set forth in equipment in the description that follows, and in equipment will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
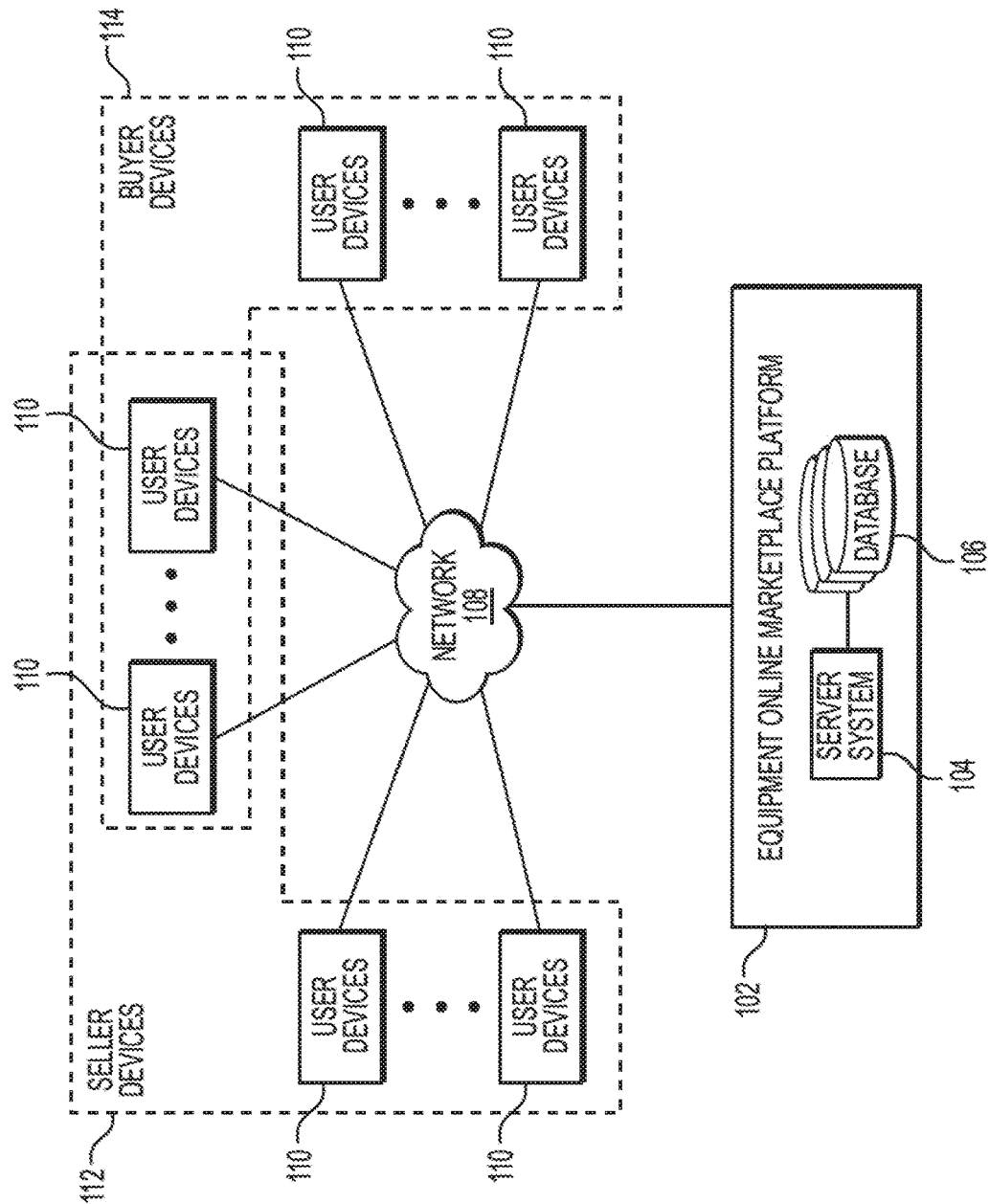
FIG. 1 depicts a block diagram of a system for an equipment online marketplace, according to aspects of the disclosure.

The following embodiments describe systems and methods for generating a digital identity of equipment on a blockchain-based equipment online marketplace platform. As used herein, "equipment" may include products or services traded in primary and secondary marketplaces among organizations. As such, "equipment" may include, for example, aircraft, aerospace parts and components, time-constrained equipment/services such as airport gates and runways, or any other aerospace-related product or service traded among airlines, airports, aircraft, or aerospace OEMs. While the exemplary equipment online marketplace platform of the present disclosure relates to aerospace equipment, "equipment" may also include any type of vehicle (e.g., automobile, boat, spacecraft, etc.), vehicle parts and components, vehicle services, heavy equipment, heavy equipment parts and components, heavy equipment services, computing devices, computing device parts and components, computing device services, or any other products or services traded in primary and secondary marketplaces among organizations.

As described above, it is difficult to establish trust among buyers and sellers in an equipment online marketplace, such as an aerospace parts online marketplace. Embodiments of the present disclosure provide solutions to these barriers by providing a new workflow enabled by using blockchain and other assistive technologies to help increase the trust in an equipment online marketplace platform trading, for example, in safety-critical systems such as aerospace parts. The equipment online marketplace platform of the present disclosure is differentiated by establishing trust among users (e.g., between sellers and buyers). For example, the blockchain-enabled equipment online marketplace platform allows buyers to trust the digital representation of the physical equipment being listed on the blockchain-enabled equipment online marketplace platform. Embodiments of the present disclosure may establish trust between buyers and sellers by using an immutable equipment registry, such as a blockchain shared database. For example, a secure digital equipment registry may include trusted equipment attributions, equipment traceability, and automated equipment trace. Embodiments of the present disclosure may allow buyers and sellers to track equipment usage, ownership, and transfers.

A blockchain-enabled equipment online marketplace may increase the overall trust in the system by introducing consensus-based accreditation methods in three dimensions:
  i. Trust on the digital identities of all participants (i.e., users) of the network, such as sellers, buyers, original equipment manufacturers (OEMs) and their internal sub-organizations.
  ii. Trust on the digital equipment representing the physical equipment by its attributes (e.g., identity of the equipment, ownership of the equipment, and/or quality and state of the equipment).
  iii. Trust on the transactions on the digital equipment performed once it's registered by the equipment trace (e.g., maintenance information, change in ownership).

Embodiments of the present disclosure further use a set of stepped methods that allow the operations to be transparent and may allow automating the processes above while coordinating the transactions on the equipment online marketplace platform. Embodiments of the present disclosure may further comprise initial trusted identities represented by the organization nodes. Tasks of equipment registration, equipment pedigree trace, and ownership change accreditation may be streamlined by the set of steps as described below.

The subject matter of the present disclosure will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in equipment.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Referring now to the appended drawings, FIG. 1 depicts a block diagram of a system 100 for an equipment online marketplace, according to aspects of the disclosure. As shown in FIG. 1, the system 100 for an equipment online marketplace may include an equipment online marketplace platform 102, such as an aerospace parts online marketplace platform, including server systems 104 and shared databases 106. The server systems 104 may store and execute the equipment online marketplace platform 102 for use through a network 108, such as the Internet. The equipment online marketplace platform 102 may be implemented through one or more server systems 104, such as an application program interface (API) server, web page servers, image servers, listing servers, processing servers, search servers, or any other types of front-end or back-end servers.

Users may access the equipment online marketplace platform 102 through the network 108 by user devices 110. User devices 110 may allow a user to display a Web browser for accessing the equipment online marketplace platform 102 from the server system 104 through the network 108. The user devices 110 may be any type of device for accessing Web pages, such as personal computing devices, mobile computing devices, or the like. User devices 110 may be seller devices 112 or buyer devices 114. As such, users may be sellers and/or buyers through the equipment online marketplace platform 102. As further shown in FIG. 1, user devices 110 may be both seller devices 112 and buyer devices 114. Thus, users may access the equipment online marketplace platform 102 as both sellers and buyers.

Further, the equipment online marketplace platform 102 may provide a seller interface and a buyer interface. The seller interface may be displayed to a user accessing the equipment online marketplace platform 102 as a seller on a user device 110. The seller interface may include features to enable a seller to enter, or input, the information of the equipment that the seller desires to sell through the equipment online marketplace platform 102. For example, the seller interface may allow a seller to create, edit, or delete equipment listings based on the information of corresponding equipment. The buyer interface may be displayed to a user accessing the equipment online marketplace as a buyer on a user device 110. The buyer interface may include features to enable a buyer to search for, select, and purchase equipment from an equipment listing created by a seller.

As discussed above, the equipment online marketplace platform for trading equipment may provide features for establishing trust among users of the equipment online marketplace platform 102. For example, the tasks of equipment registration, equipment pedigree trace, and ownership change accreditation may include a shared database 106, such as a blockchain shared ledger.

Figure 2:
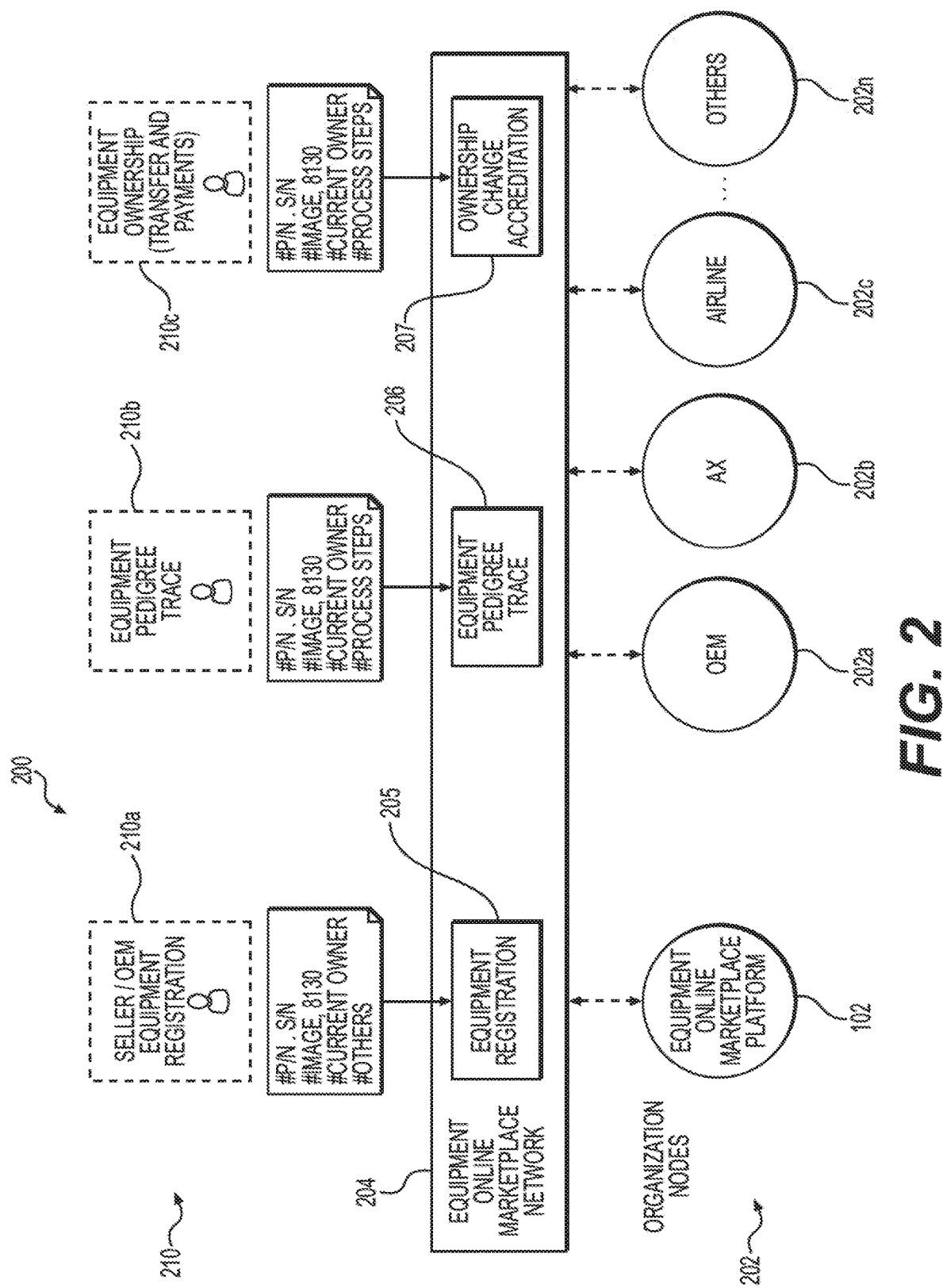
FIG. 2 depicts a block diagram of a blockchain-based equipment online marketplace implemented by the system of FIG. 1.

FIG. 2 depicts a block diagram of a blockchain-based equipment online marketplace 200. As shown in FIG. 2, the blockchain-based equipment online marketplace 200 may include organization nodes 202 connected to an equipment online marketplace network 204. The organization nodes 202 may include organizations that sell and/or buy equipment, such as aerospace parts. For example, the organization nodes 202 may include OEMs 202a, airports (AX) 202b, airlines 202c, or other sellers and/or buyers 202n of aerospace parts or any other equipment, such as maintenance repair and operations (MRO) suppliers. The organization nodes 202 may further include the organization maintaining and implementing the equipment online marketplace platform 102, implemented on the server systems 104.

In the blockchain-enabled equipment online marketplace 200, the organization nodes 202 may act as nodes in a blockchain network, such as network 204. As such, the nodes may be distributed across a widespread network and may carry out a variety of tasks. The nodes may include user devices 110, connected to the network 108, as described above. The nodes may support the online marketplace network 204 by maintaining a copy of a blockchain shared ledger 106. The organization nodes 202 may contribute to the task of validating the digital identity of the equipment in a listing, as further described below.

The equipment online marketplace network 204 may include tasks and/or other services provided by the equipment online marketplace 200. The organization nodes 202 may carry out a number of the tasks of the equipment online marketplace 200 of the present disclosure. For example, the equipment online marketplace network 204 may include tasks of equipment registration 205, equipment pedigree trace 206, and ownership change accreditation 207 in which the organization nodes 202 contribute, as detailed below.

A first task of equipment registration 205 may include an equipment registration method. The equipment registration method may allow users 210 that are authorized by the organization to upload information of the equipment. For example, a current owner 210a of the equipment (e.g., a seller) may upload information of the physical equipment via the equipment online marketplace platform 102. As such, the physical equipment's attributes may be used to represent it in the digital world on the equipment online marketplace platform 102. A unique identity is created for the equipment and stored in the shared ledger 106 as a blockchain entry for the equipment, from where the unique identity of the equipment may be referenced for future use, as further detailed below. The equipment registration method may include verifying the authenticity of the ownership of the equipment, such that the identity of the equipment and the records attached to the equipment may be trusted by other users 210. The unique identity of an aerospace part, for example, may include a part number, a serial number, an image of the part, a Form FAA 8130-3 for the part, among other information of the part or equipment.

A second task of an equipment pedigree trace 206 may include a traceable equipment pedigree method. The traceable equipment pedigree method may allow other users 210b that are currently in possession of the equipment (e.g., shippers, maintenance technicians, etc.) to upload information of any action performed on the equipment. For example, the traceable equipment pedigree method may include storing all actions performed on the equipment, such as maintenance functions, across organizations in the shared ledger 106 as a blockchain entry for the equipment, as further detailed below. Maintenance functions performed on the equipment may be verified by smart contracts. As used herein, a "smart contract" is a computer code stored in the blockchain shared ledger containing a set of pre-defined rules under which parties to the contract agree to interact with each other. When the pre-defined rules are met, the contract, or agreement, may be automatically enforced. For example, the smart contract for the equipment may include a clause (or rule) for performing maintenance on the equipment by a set date. Server 104 may receive information related to the maintenance functions performed on the equipment and the smart contract may verify the information and determine that the maintenance occurred prior to the set date. Thus, server 104 may verify the maintenance functions by the smart contract.

In one embodiment, the history of the maintenance functions performed on the equipment stored in the shared ledger may be queried or accessed by a user 210 through the equipment online marketplace platform 102 to trace a history of the equipment. The equipment pedigree trace for an aerospace part may include, for example, information such as part number, serial number, image of the art, Form FAA 8130-3 for the part, current owner of the part, maintenance steps performed on the part, or any other information related to tracing the history of the part or equipment.

In one embodiment, actions, or events, of the equipment may be sourced from multiple organizations 202a-n that include users 210 of the equipment online marketplace network 204 from historical or live records. For example, a shipper may be authorized by the network 204 to submit shipping event transactions and information to the network 204. The transaction and/or information may be endorsed by other organizations 202a-n and the shipping status and information may be recorded in the shared ledger 106 as a blockchain entry for the equipment.

A third task of an ownership change accreditation method 207 may include references to a change in ownership of the equipment being recorded and accredited consensually using smart contracts. Current owners 210c of the equipment may upload information regarding the change of ownership of the equipment. For example, the ownership of the equipment may be stored in the shared ledger 106 as a blockchain entry for the equipment. In one embodiment, the ownership change accreditation method 207 may include submitting a sale transaction between users 210 (a seller and a buyer) to the network 204 when a bill of sale is recorded on the equipment online marketplace platform 102. The transaction may be endorsed and the new ownership information (e.g., the buyer becomes the new owner the equipment) may be recorded to the blockchain entry for the equipment in the shared ledger 106.

Figure 3:
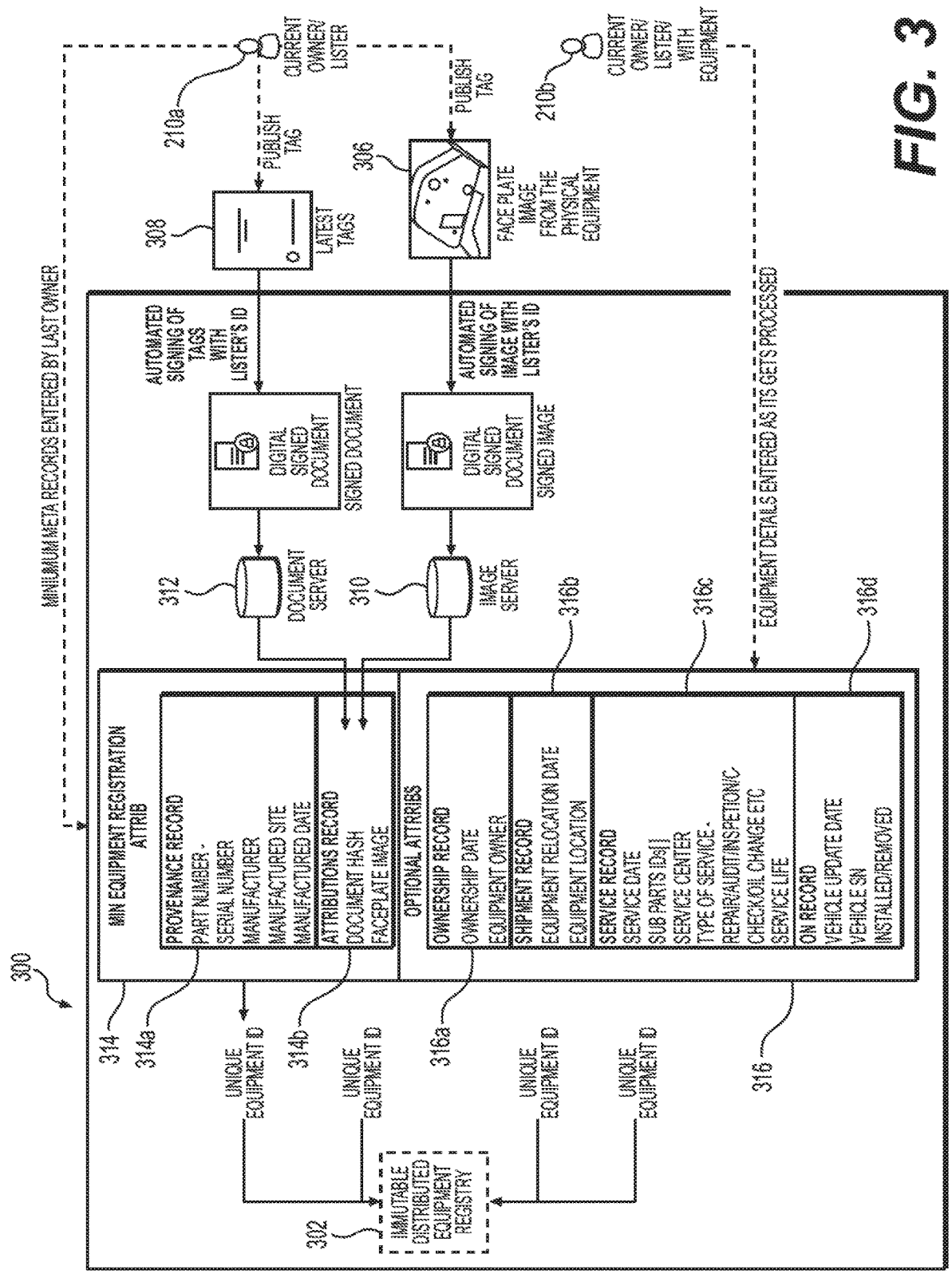
FIG. 3 depicts a block diagram of a system for generating a digital identity of equipment on the blockchain-based equipment online marketplace of FIG. 2.

FIG. 3 depicts a block diagram of a system 300 for generating a digital identity of equipment on the blockchain-based equipment online marketplace platform 102. As shown in FIG. 3, system 300 may include a blockchain shared ledger, such as an immutable distributed equipment registry 302. To register the equipment on the equipment online marketplace platform 102, a user 210 may upload one or more images 306 and/or documents 308 containing information of the equipment to the server 104 through the network 108. The user 210 may be the current owner 210a of the equipment (e.g., a seller) or another user 210b that is currently in possession of the equipment (e.g., a shipper or maintenance technician).

In one embodiment, the one or more images 306 and/or documents 308 may include up-to-date certified release forms. For aerospace parts, for example, the server may receive up-to-date certified release forms, such as FAA Form 8130. The certified release forms may be certified by a government entity, such as the Federal Aviation Administration (FAA), and may authorize the equipment to be used on, for example, a vehicle. For vehicle parts or aerospace parts, for example, the certified release forms may contain information of the part, such as description, part number, serial number, status of the part, manufacturing information, safe condition information, and other information about the part that may be certified by the government entity. The server may also receive an image 306 of the equipment from the user 210. For vehicle parts or aerospace parts, for example, the image 306 may be of a faceplate and the faceplate may contain information of the part, such as part number, serial number, manufacturer, or other relevant information of the part.

The one or more images 306 and/or documents 308 may be digitally signed by the user 210 with the user's identification number (e.g., DUN number and/or organization name). The server 104 may include an equipment image server 310 for receiving and processing the one or more images 306. The server 104 may also include a document server 312 for receiving and processing the one or more documents 308. As such, the server 104 may receive, process, and store the one or more images 306 and/or documents 308 containing the information of the equipment to generate a blockchain entry for the equipment on the shared ledger 302.

The server 104 may parse the one or more images 306 and/or documents 308 and extract attribute information 314 of the equipment from each image 306 and/or document 308. The attribute information 314 may be stored to the blockchain entry for the equipment on the shared ledger 302. The attribute information 314 for identifying the equipment may include a provenance record 314a including equipment number (e.g., part number), serial number, manufacturer, manufactured site, and manufactured date. The attribute information 314 may also include an attributions record 314b including the uploaded one or more images 306 and/or documents 308. In one embodiment, the provenance record 314a and attributions record 314b may be the minimum equipment information needed for identifying the equipment and for registering the equipment on the equipment online marketplace platform 102. The server may create and assign a unique equipment identification number corresponding to the equipment information received for the respective equipment. As such, each unique equipment that is registered on the equipment online marketplace platform 102 may include a unique equipment identification number for identifying the equipment.

Each equipment may further include optional equipment information 316 that may be stored in the blockchain entry for the equipment for further identifying and tracing the equipment. For example, another user 210b currently in possession of the equipment (e.g., a shipper or maintenance technician) may upload additional information of the equipment to the blockchain entry for the equipment in shared ledger 302, as further detailed below. The optional equipment information 316 may include, for example, an ownership record 316a, a shipment record 316b, a service record 316c, and an on-vehicle record 316d. The ownership record 316a may include ownership date and the current owner of the equipment. Shipment record 316b may include equipment relocation date and current equipment location. Service record 316c may include, for example, service date, sub-equipment identification numbers, service center, type of service, repair/audit/inspection/c-check/oil change, etc. and service life. For vehicle parts or aerospace parts, the on-vehicle record 316d may include vehicle update date, vehicle identification information (e.g., aircraft tail number and serial number), and date when the part was installed and/or removed from the vehicle.

The optional equipment information 316 may be updated in the blockchain entry as information of the equipment is modified and/or updated and the new information is processed by the traceable equipment pedigree method or ownership change accreditation method, detailed above. As such, the optional equipment information 316 may be used to trace a history of the equipment. For example, when the equipment is shipped, the other user 210b currently in possession of the equipment may upload one or more images 306 and/or documents 308 of the shipment information to the shipment record 316b to provide updated information of the shipment record 316b. In one embodiment, the other user 210b may also manually input the shipment information on the equipment online marketplace platform 102. This updated information may be stored in the blockchain entry for the respective equipment in the shared ledger 302. Another user 210 (e.g., a buyer) of the equipment online marketplace platform 102 may then query and/or view the shipment information to view a history of the respective equipment.

Figure 4:
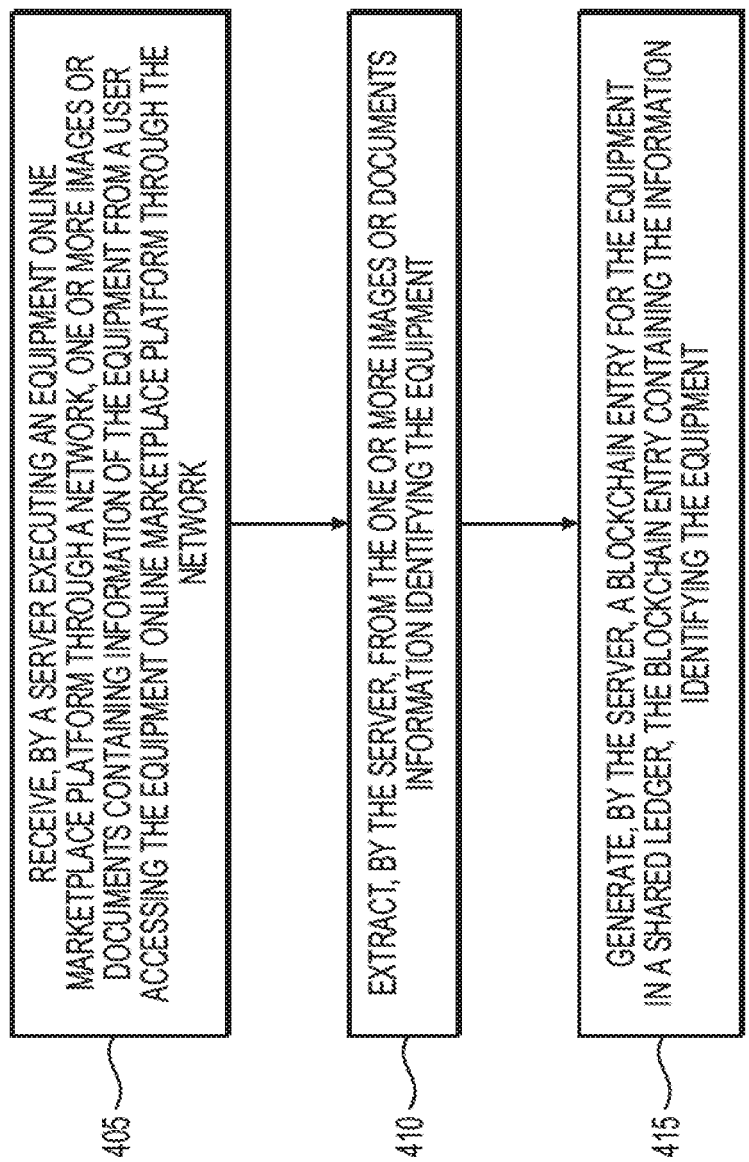
FIG. 4 depicts a flow diagram of an exemplary embodiment of a process for creating a digital identity of equipment on the blockchain-based equipment online marketplace of FIG. 2.

FIG. 4 depicts a flow diagram of a method 400 for generating a digital identity for equipment on an equipment online marketplace platform 102. In an initial step 405, the server 104 executing the equipment online marketplace platform 102 through network 108 may receive one or more images 306 or documents 308 containing information of the equipment from a user 210 accessing the equipment online marketplace platform 102 through network 108. In one embodiment, the one or more images 306 or documents 308 may include one or more images of a faceplate of the equipment, such as a faceplate of an aerospace part. In one embodiment, the one or more images 306 or documents 308 may be digitally signed by the user 210 prior to server 104 receiving the one or more images 306 or documents 308.

In step 410, server 104 may extract information identifying the equipment from the received one or more images 306 or documents 308. For example, server 104 may use a character recognition code, such as optical character recognition (OCR), to extract the information of the equipment from the received one or more images 306 or documents 308. In one embodiment, the information identifying the equipment may be included in a metadata file associated with the received one or more images 306 or documents 308.

In one embodiment, server 104 may verify the information identifying the equipment in the one or more images 306 or documents 308 by smart contracts. In one embodiment, the information identifying the equipment may include at least one of an equipment number, a serial number, a manufacturer, a manufactured site, or a manufactured date. In one embodiment, the information identifying the equipment may further include at least one of current ownership information, ownership date, current equipment location, or equipment relocation date. In one embodiment, the information identifying the equipment may further include at least one of a service date, an equipment ID, a service center, a type of service, or a service life. In one embodiment, the equipment may be a vehicle part and the information identifying the equipment may include at least one of a vehicle update date, a vehicle serial number, or a date when the vehicle part was installed or removed from the vehicle.

In step 415, server 104 may generate a blockchain entry for the equipment in shared ledger 302, the blockchain entry may contain the information identifying the equipment. In one embodiment, server 104 may create a unique identification number for the equipment corresponding to the information identifying the equipment and the blockchain entry may contain the unique identification number for the equipment. Thus, a verified digital identity for the equipment may be generated on the equipment online marketplace platform 102.

In one embodiment, server 104 may update the blockchain entry for the equipment when server 104 receives additional information of the equipment. For example, server 104 may receive one or more additional images 306 or documents 308 containing additional information of the equipment from a user 210, such as another user 210b currently in possession of the equipment (e.g., a shipper or maintenance technician). For example, after a digital identity has been generated for the equipment, ownership of the equipment may change, the equipment may be shipped for maintenance or shipped when sold, the equipment may be serviced for maintenance, and/or if the equipment is a vehicle part, the equipment may be removed from, or installed, on a vehicle. Thus, when information of the equipment changes or is updated, a user 210 may upload the additional images 306 or documents 308 of the equipment.

In one embodiment, the user 210 may input the additional information manually through the equipment online marketplace platform 102. As such, the additional information of the equipment may include at least one of current ownership information, ownership date, current equipment location, or equipment relocation date. In one embodiment, the additional information of the equipment may further include at least one of a service date, an equipment ID, a service center, a type of service, or a service life. In one embodiment, the equipment may be a vehicle part and the additional information of the equipment may include at least one of a vehicle update date, a vehicle serial number, or a date when the vehicle part was installed or removed from the vehicle.

In one embodiment, server 104 may extract the additional information of the equipment from the one or more additional images 306 or documents 308. Server 104 may use smart contracts to verify the additional information of the equipment in the one or more additional images 306 or documents 308. In one embodiment, server 104 may update the blockchain entry for the equipment in the shared ledger 302 to include the additional information of the equipment.

Figure 5:
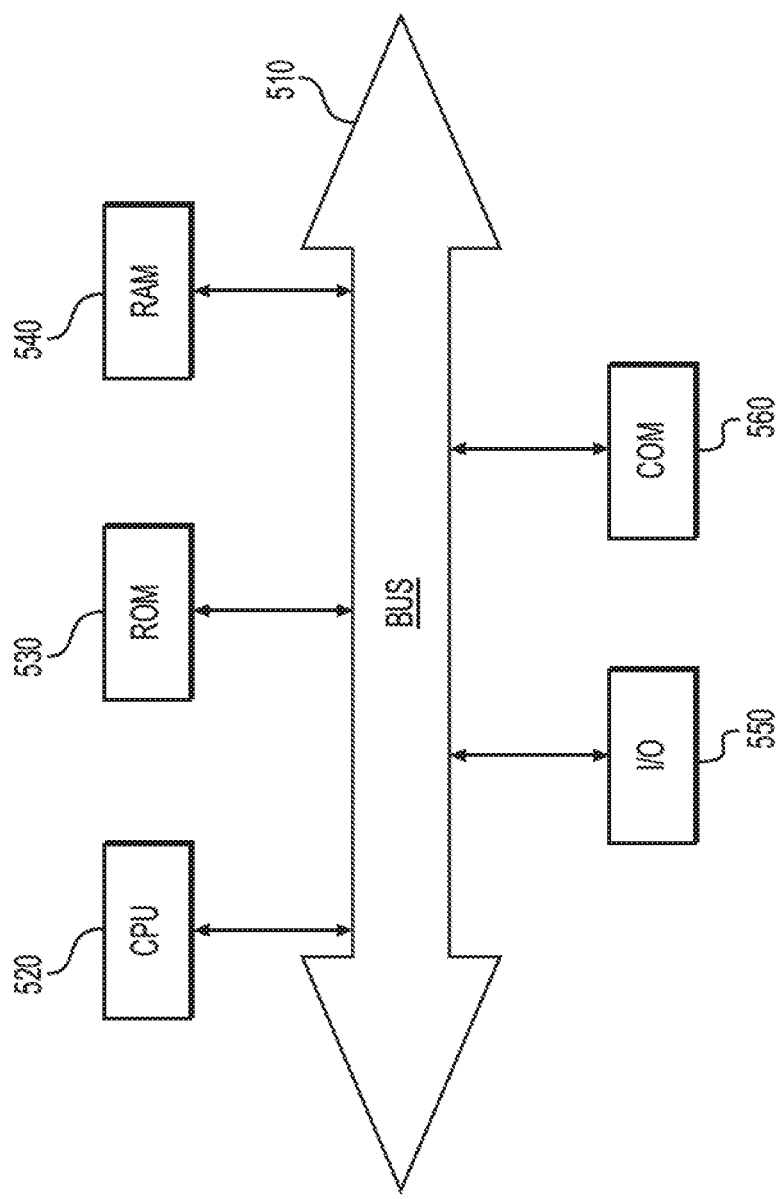
FIG. 5 depicts a high-level functional block diagram of an exemplary computer device or system, in which embodiments of the present disclosure, or portions thereof, may be implemented.

FIG. 5 depicts a high-level functional block diagram of an exemplary computer device or system, in which embodiments of the present disclosure, or portions thereof, may be implemented, e.g., as computer-readable code. For example, each of the exemplary systems, user interfaces and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4 may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 may also include a main memory 540, for example, random access memory (RAM), and may also include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for generating a digital identity of equipment on an equipment online marketplace platform, the method comprising:
   receiving, by a server executing the equipment online marketplace platform through a network, one or more images or documents, including an up-to-date release form containing information about the equipment that has been certified by a government entity and authorizing the equipment to be used on a vehicle, and a metadata file associated with the one or more images or documents, the one or more images or documents and the metadata file received from a user accessing the equipment online marketplace platform on a user device through the network;
   extracting, by the server, at least the information identifying the equipment by at least parsing the one or more images or documents to extract the information identifying the equipment from within the one or more images or documents; and
   generating, by the server, a blockchain entry for the equipment in a shared ledger, the blockchain entry containing the extracted information identifying the equipment and an attributions record including the one or more images or documents from which the information identifying the equipment was extracted; and creating, by the server and based at least in part on the extracted information identifying the equipment, a unique identification number for the equipment corresponding to the information identifying the equipment using the one or more images or documents included in the attribution record as an image or document-based information source for the unique identification number.

2. The method of claim 1, further comprising:
verifying, by the server, the information identifying the equipment in the metadata file by smart contracts.

3. The method of claim 2, wherein the one or more images or documents are digitally signed by the user prior to receiving the one or more images or documents and the metadata file to execute the smart contracts.

4. The method of claim 1,
wherein the blockchain entry contains the unique identification number for the equipment.

5. The method of claim 1, wherein the one or more images of the equipment include one or more images of a faceplate of the equipment, the faceplate including information corresponding to the information identifying the equipment.

6. The method of claim 1, wherein the information identifying the equipment includes at least one of an equipment number, a serial number, manufacturer, manufactured site, or manufactured date.

7. The method of claim 1, further comprising:
receiving, by the server, additional information of the equipment from a user; and
updating, by the server, the blockchain entry for the equipment in the shared ledger with the additional information of the equipment.

8. The method of claim 7, wherein the additional information of the equipment includes at least one of current ownership information, ownership date, current equipment location or equipment relocation date.

9. The method of claim 7, wherein the additional information of the equipment includes at least one of a service date, an equipment ID, a service center, a type of service, or a service life.

10. The method of claim 7, wherein the equipment is a vehicle part and the additional information of the equipment includes at least one of a vehicle update date, a vehicle serial number, or a date when the vehicle part was installed or removed from the vehicle.

11. The computer-implemented method of claim 1, further comprising:
receiving, by the server, transaction data indicating a transaction of the equipment between a first organization node and a second organization node;
receiving, by the server, endorsement data endorsing the transaction by at least one other organization node; and
in response to receiving the endorsement data, generating, by the server, an additional blockchain entry for the transaction of the equipment in the shared ledger.

12. A system for generating a digital identity of equipment on an equipment online marketplace platform, comprising:
a memory having processor-readable instruction therein; and
at least one processor configured to access the memory and execute the processor-readable instructions, which when executed by the processor configures the processor to perform a plurality of functions, including functions for:

receiving, by a server executing the equipment online marketplace platform through a network, one or more images or documents, including an up-to-date release form containing information about the equipment that has been certified by a government entity and authorizing the equipment to be used on a vehicle, the metadata file information identifying the equipment, the one or more images or documents and the metadata file received from a user accessing the equipment online marketplace platform on a user device through the network;

extracting, by the server, at least the information identifying the equipment by at least parsing the one or more images or documents to extract the information identifying the equipment from within the one or more images or documents; and generating, by the server, a blockchain entry for the equipment in a shared ledger, the blockchain entry containing the extracted information identifying the equipment and an attributions record including the one or more images or documents from which the information identifying the equipment was extracted; and creating, by the server and based at least in part on the extracted information identifying the equipment, a unique identification number for the equipment corresponding to the information identifying the equipment using the one or more images or documents included in the attribution record as an image or document-based information source for the unique identification number.

13. The system of claim 12, wherein the plurality of functions further include functions for:
verifying, by the server, the information identifying the equipment in the metadata file by smart contracts.

14. The system of claim 13, wherein the one or more images or documents are digitally signed by the user prior to receiving the one or more images or documents and the metadata file to execute the smart contracts.

15. The system of claim 12,
wherein the blockchain entry contains the unique identification number for the equipment.

16. The system of claim 12, wherein the one or more images of the equipment include one or more images of a faceplate of the equipment, the faceplate including information corresponding to the information identifying the equipment.

17. The system of claim 12, wherein the information identifying the equipment includes at least one of an equipment number, a serial number, manufacturer, manufactured site, or manufactured date.

18. The system of claim 12, wherein the plurality of functions further include functions for:
receiving, by the server, additional information of the equipment from a user; and
updating, by the server, the blockchain entry for the equipment in the shared ledger with the additional information of the equipment.

19. The system of claim 18, wherein the additional information of the equipment includes at least one of current ownership information, ownership date, current equipment location or equipment relocation date.

20. A non-transitory computer-readable medium containing instructions for facilitating equipment trading through an equipment online marketplace platform, comprising:
receiving, by a server executing the equipment online marketplace platform through a network, one or more images or documents, including an up-to-date release form containing information about the equipment that has been certified by a government entity and authorizing the equipment to be used on a vehicle, the metadata file containing information identifying the equipment, the one or more images or documents and the metadata file received from a user accessing the equipment online marketplace platform on a user device through the network;

extracting, by the server, at least the information identifying the equipment by at least parsing the one or more images or documents to extract the information identifying the equipment from within the one or more images or documents; and generating, by the server, a blockchain entry for the equipment in a shared ledger, the blockchain entry containing the extracted information identifying the equipment and an attributions record including the one or more images or documents from which the information identifying the equipment was extracted; and creating, by the server and based at least in part on the extracted information identifying the equipment, a unique identification number for the equipment corresponding to the information identifying the equipment using the one or more images or documents included in the attribution record as an image or document-based information source for the unique identification number.

* * * * *